United States Patent [19]

Finelli et al.

[11] Patent Number: 4,937,676
[45] Date of Patent: Jun. 26, 1990

[54] ELECTRONIC CAMERA SYSTEM WITH DETACHABLE PRINTER

[75] Inventors: Patrick L. Finelli, Sudbury; Hugh R. MacKenzie, Belmont; William J. McCune, Jr., South Lincoln, all of Mass.

[73] Assignee: Polariod Corporation, Cambridge, Mass.

[21] Appl. No.: 308,644

[22] Filed: Feb. 10, 1989

[51] Int. Cl.⁵ .............................. H04N 5/30
[52] U.S. Cl. .................. 358/229; 358/906; 358/909
[58] Field of Search .......... 358/229, 906, 909; 360/33.1, 35.1; 354/75, 76, 85, 86

[56] References Cited

U.S. PATENT DOCUMENTS

| | | | |
|---|---|---|---|
| 4,097,893 | 6/1978 | Camras | 358/83 |
| 4,130,834 | 12/1978 | Mender et al. | 358/127 |
| 4,163,256 | 7/1979 | Adcock | 358/127 |
| 4,262,301 | 4/1981 | Erlichman | 358/6 |
| 4,420,773 | 12/1983 | Toyoda et al. | 358/335 |
| 4,456,931 | 6/1984 | Toyoda et al. | 358/335 |
| 4,489,351 | 12/1984 | d'Alayer de Costemore d'Arc | 358/213 |
| 4,507,689 | 3/1985 | Kozuki et al. | 360/33.1 |
| 4,525,729 | 6/1985 | Agulnek et al. | 346/154 |
| 4,541,704 | 9/1985 | Freeman | 354/432 |
| 4,547,815 | 10/1985 | Kimura | 358/335 |
| 4,827,347 | 5/1989 | Bell | 358/224 |

Primary Examiner—Jin F. Ng
Assistant Examiner—Magdy Shehata
Attorney, Agent, or Firm—Edward S. Roman

[57] ABSTRACT

A compact, handheld portable electronic imaging system including both an electronic imaging camera and hard copy printer are separately housed with respect to each other and readily interconnectable with respect to each other for use either in combination or apart. Means for storing electronic images may be connected to the camera and/or printer housings so that when used apart image defining electronic image information signals may be initially directed for storage by the electronic imaging camera and the storage device thereafter connected to the printer for the making of hard copies therefrom. Alternatively, the electronic imaging camera and printer may be used in combination to provide an immediate hard copy of the image sensed in a manner analogous to that of an instant photographic camera of the self-processing type.

14 Claims, 4 Drawing Sheets

ELECTRONIC CAMERA SYSTEM WITH DETACHABLE PRINTER

BACKGROUND OF THE INVENTION

1. Field of the Invention

This invention relates generally to a readily portable electronic imaging system for use in the field and, more particularly, to an electronic imaging system comprising both a camera and printer separately housed and readily connectable with respect to each other in the field and also readily connectable to an electronic image storage device

2. Description of the Prior Art

Handheld electronic imaging cameras that can electronically record an image of a scene and thereafter print out a hard copy print of the recorded image on a nonphotosensitive image receiving sheet such as that disclosed in U.S. Pat. No. 4,262,301, entitled "Electronic Imaging Camera", by I. Erlichman, issued Apr. 14, 1981, in common assignment herewith, are now known to the art. The electronic camera and printer are built as an integral unit and must both be carried into the field together whenever the camera is used even though the camera user may not actually desire hard copy prints in the field. In addition, a hard copy print of the recorded image is provided by a nonphotographic process onto a nonphotosensitive image receiving sheet. Such printer systems although providing a highly satisfactory copy for many purposes nevertheless do not provide photographic quality hard copy prints.

Therefore, it is a primary object of this invention to provide a compact, handheld electronic imaging system comprising both a camera and printer separately housed and readily interconnectable for selective use either together or apart.

It is a further object of this invention to provide a compact, handheld electronic imaging system comprising an electronic camera and printer usable either apart or in connection with respect to each other wherein the printer can provide a photographic quality hard copy print of the image recorded by the camera.

Other objects of the invention will be, in part, obvious and will, in part, appear hereinafter. The invention accordingly comprises a mechanism and system possessing the construction, combination of elements and arrangement of parts which are exemplified in the following detailed disclosure.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein

SUMMARY OF THE INVENTION

A readily portable electronic imaging system for use in the field comprises a camera housing of a size that may be conveniently carried by hand and a printer housing distinct from the camera housing that is also of a size that may be conveniently carried by hand. An objective lens is operatively disposed with respect to the camera housing to receive and focus incident light defining scene light. A solid state light responsive array is disposed within the camera housing for receiving incident scene light by way of the objective lens and converting the scene light into an image defining electronic information signal. Means for storing the image defining electronic information signals are provided for releasable and operative connection to the camera and printer housings.

Complementary releasable connecting means operatively associated with respect to the camera and printer housings are provided for effecting a releasable fixed connection between the camera and printer housings. The fixed connection also operates to effect an electrical connection between the camera and printer housings. Hard copy printing means are disposed within the printer housing for making a hard copy of select images from the image defining electronic information signals.

Signal control and processing means have portions thereof disposed respectively within the camera and printer housings. The signal control and processing means responds to user selection to effect an exposure interval and thereafter process the image defining electronic information signals to effect a select transformation thereof. The signal control means thereafter responds to user selection to direct the transformed electronic information signals to either the storage means for storage therein or to the hard copy printing means for printing the hard copy. The portion of the signal control and processing means disposed within the printer housing is responsive to user selection when the printer housing is disconnected from the camera housing and the storage means is operatively connected to the printer housing for directing image defining electronic information signals from the storage means to the hard copy printing means in order to print hard copies of select stored images. In addition, the portion of the signal control means disposed within the camera housing is responsive to user selection when the camera housing is disconnected from the printer housing and the storage means is operatively connected to the camera housing for directing image defining electronic information signals from the light responsive array to the storage means immediately subsequent to the exposure interval.

DESCRIPTION OF THE PREFERRED EMBODIMENT

Figure 1:
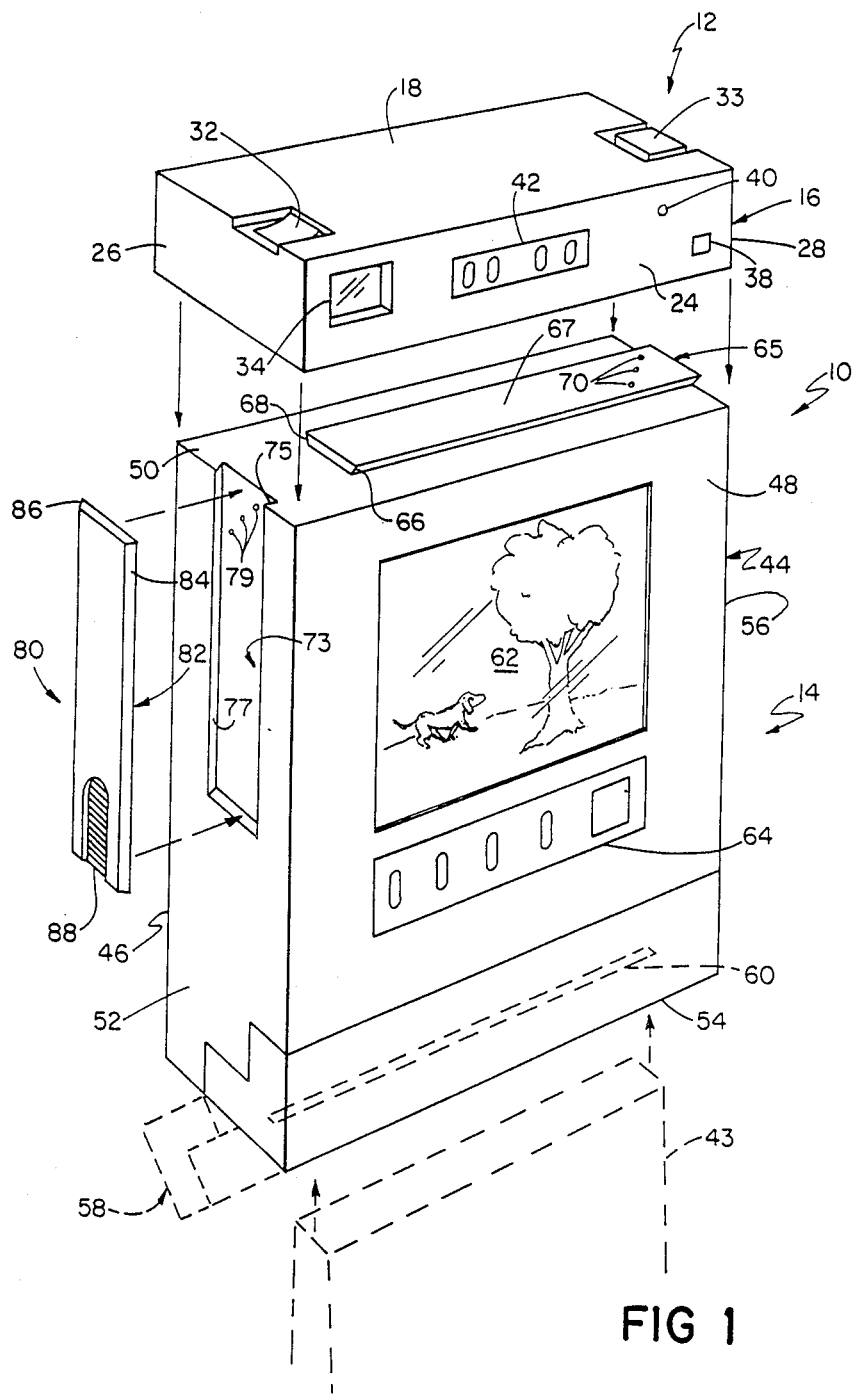
FIG. 1 is an exploded perspective view of the electronic imaging system of this invention.

Referring to FIG. 1, there is shown at 10 the electronic imaging system of this invention comprising an electronic imaging camera 12 and a hard copy printer 14. The electronic imaging camera 12 comprises a substantially parallelepiped housing structure 16 defined by a substantially planar major top wall member 18 spaced apart in parallel relation to a substantially planar major bottom wall member 20 as best viewed in FIG. 2. The top and bottom wall members 18 and 20 are interconnected by substantially planar parallel front and back wall members 22 and 24 and substantially parallel planar side wall members 26 and 28. The front wall 22 of the camera housing 16 contains an opening for admitting scene light to an objective lens 30 disposed therein. The wall 22 also contains an electronic strobe discharge window 36 through which artificial light is provided to illuminate a scene in a well-known manner. The objective lens 30 may include a manually actuable telephoto feature as is well known in the art actuable by way of a user select button 32 disposed on the top wall member 18. Use of the electronic strobe built into the camera 12 may be commenced at the discretion of the user upon the actuation of a strobe select charge switch 38 disposed on the back wall member 24. Complete charging of the electronic strobe is signified by the turning on of a strobe ready light 40 also preferably disposed on the back wall member 24. The back wall 24 of the electronic imaging camera 12 also preferably comprises a control panel 42 having a plurality of user actuatable switches that operate in the manner of this invention to be subsequently described. The camera housing is of a size that can be easily held by hand and is readily portable for field use.

The printer housing 44 comprises a substantially planar major bottom wall member 46 spaced apart in parallel relation to a substantially planar major top wall member 48. The wall members 46, 48 are described as bottom and top wall members despite their showing in FIG. 1 in an upstanding position for reasons that will become more fully appreciated by the following discussion. The wall members 46, 48 are interconnected by substantially planar minor side wall members 50, 52, 54, 56 to form a parallelepiped structure as shown. The side wall member 54 forms the major portion of a pivotal door assembly as shown in phantom at 58 in its open position to accommodate the insertion of a film cassette 43 comprising a stack of integral self-developing film units of a type manufactured by the Polaroid Corporation and well known in the art. Side wall member 54 in the pivotal door assembly 58 includes a film exit slot 60 to accommodate the exit of individual ones of the integral self-developing film units as they are exposed by the hard copy printer 14 in a manner as will be more fully described herein. The wall member 48 includes a liquid crystal display panel 62 for displaying recorded images in the manner of this invention. The wall member 48 is also provided with a control panel 64 comprising a plurality of user actuatable switches which can be operated in the manner of this invention to be subsequently described. The printer housing 44 is also of a size that can be easily held by hand and is also readily portable for field use even when connected to the camera housing in the manner of this invention.

Complementary releasable connecting means operatively associated with respect to the camera and printer housings 16, 44 are provided for effecting a releasable fixed connection between the camera and the printer housings so that both the electronic imaging camera 12 and the hard copy printer 14 can be operated together in the manner of this invention. The releasable connecting means preferably comprises a raised elongated tongue member 65 extending outwardly from the side wall member 50 and comprising a pair of spaced apart substantially parallel beveled side walls 66 and 68. The tongue member 65 also comprises a substantially planar top surface portion 67 upon which are disposed a plurality of electrical contacts as shown at 70.

Figure 2:
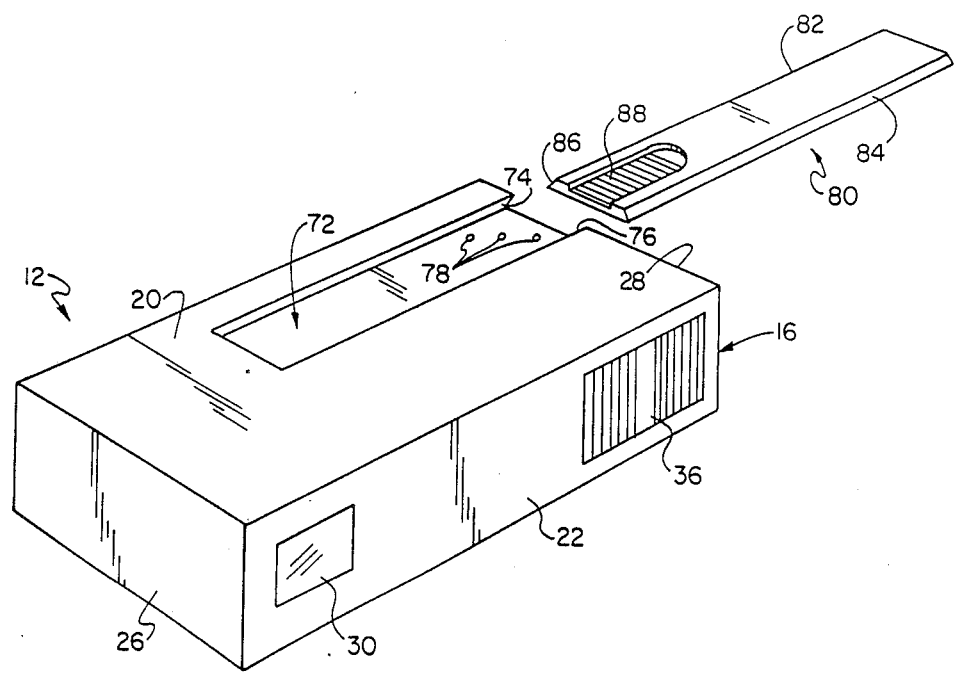
FIG. 2 is a perspective view of the electronic imaging camera and image storage portions of the electronic imaging system of FIG. 1.

That portion of the releasable connecting means operatively associated with the electronic camera 12 is best shown in FIG. 2 as comprising an elongated recessed groove 72 having substantially parallel bevelled side walls 74, 76. Within the groove 72 there are provided a plurality of electrical contacts as shown at 78. Physical and electrical interconnection between the camera housing 16 and the printer housing 44 is effected by longitudinally sliding the elongated tongue member 65 of the printer housing 44 into the recessed groove 72 in the camera housing 16. As is readily apparent the bevelled side walls 66, 68 of the raised tongue member 65 engage the complimentary bevelled side walls 74, 76, respectively, to maintain the camera and printer housings 16, 44 in fixed connection with respect to each other. In addition, electrical connection is established between the camera and printer housings 16, 44 by the electrical contacts 70 engaging respective corresponding ones of the electrical contacts 78. It will be readily understood that the sliding motion of the electrical contacts 70, 78 over each other which occurs in concert with the sliding movement of the complementary tongue and groove members during camera and printer connection and disconnection respectively operates to wipe clean the electrical contacts thereby insuring a reliable positive electrical connection each time the camera and printer are connected.

The electronic imaging system 10 of this invention further includes an electronic information storage device 80 housed in an elongated substantially parallelepiped housing 82. The information storage device 80 preferably comprises a solid state memory such as an electronically programmable read only memory (EPROM) as fully disclosed in U.S. patent application Ser. No. 102,859, entitled "Electronic Imaging Camera Utilizing EPROM Memory", by David D. Pape, filed in common assignment herewith. The elongated housing 82 of the storage device 80 includes spaced apart substantially parallel bevelled side walls as shown at 84, 86 to accommodate its retention upon insertion into the recessed groove member 72 of the camera 12. As is now readily apparent, the bevelled side walls 86, 84 engage corresponding bevelled side walls 74, 76 respectively of the recessed groove 72 so as to be fixedly connected with respect to the camera housing 16 in the same manner by which the printer housing 44 can be physically connected to the camera housing 16. Also, as will be readily understood, the information storage device 80 also comprises a plurality of electrical contacts (not shown) that make corresponding electrical connection to the plurality of electrical contacts 78 in the recessed groove 72.

The side wall member 52 of the printer housing 44 also includes an elongated recessed groove as shown at 73 defined by two substantially parallel bevelled side walls 75 and 77. A plurality of electrical connectors 79 are also disposed on the face of the groove 73. The information storage device 80 may also be inserted in the aforementioned manner into the recessed groove 73 in the side wall 52 of the printer housing 44 to establish a fixed structural connection therebetween. As is readily apparent, the plurality of electrical contacts (not shown) on the storage device 80 connect to respective ones of the electrical contacts 79 in the aforementioned manner so as to also establish an electrical connection from the hard copy printer 14 to the storage device 80 for reasons which will become more apparent from the following discussion. The information storage device 80 includes a recessed area as shown at 88 in order to enable the camera user to better engage the storage device during insertion into or removal from the recessed grooves in either the camera or printer housings.

Figure 3:
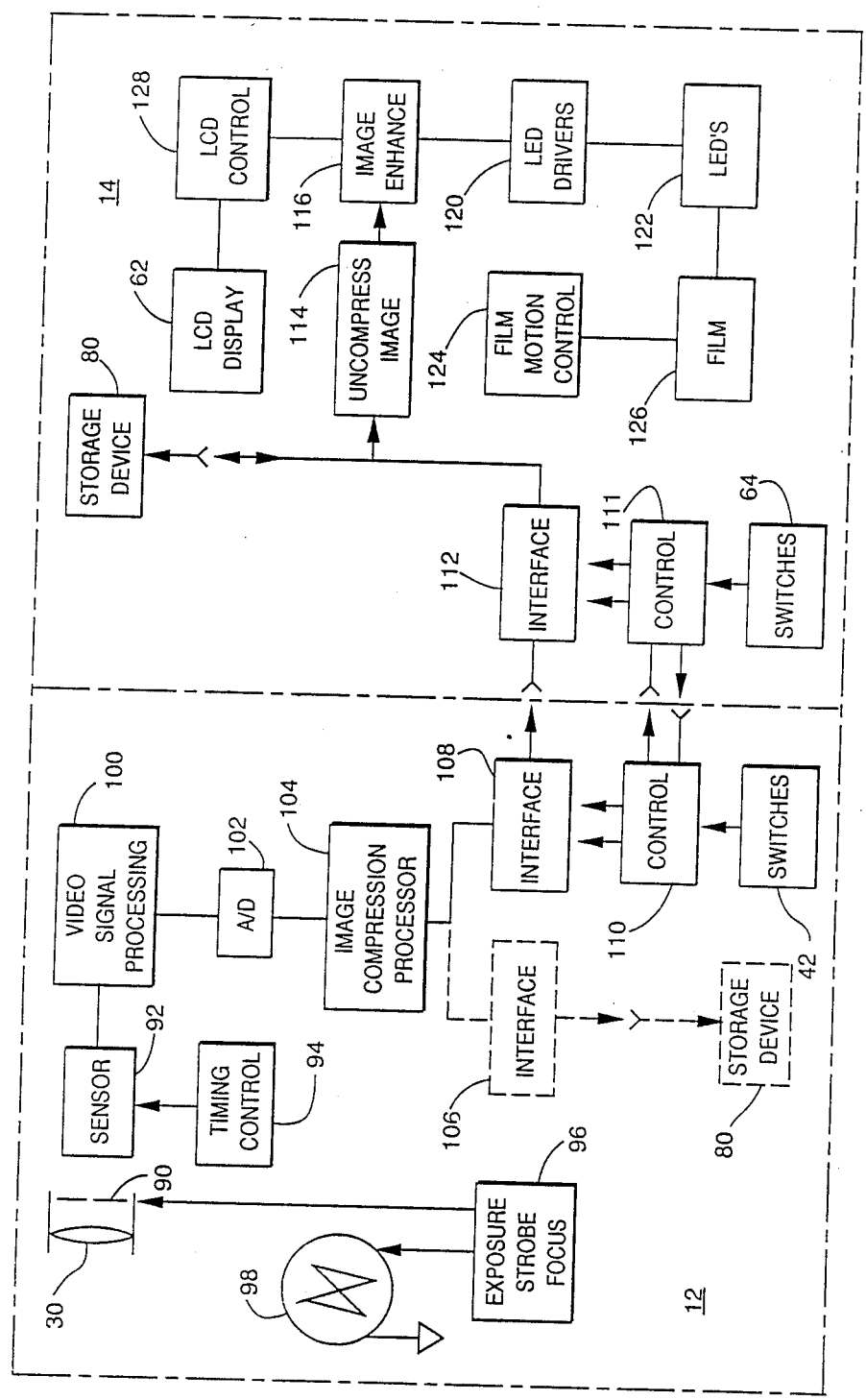
FIG. 3 is a circuit block diagram of the electronic imaging system of FIG. 1.

Referring now to FIG. 3, there is shown a circuit block diagram for the electronic imaging system 10 of this invention. The electronic imaging camera 12 comprises the objective taking lens 30 for viewing the scene to be electronically recorded and directing the image defining scene light rays to a two-dimensional photoresponsive area array as shown at 92 preferably comprising a high resolution charge coupled device (CCD) or alternatively a charge injection device (CID). The photoresponsive array 92 comprises a plurality of image sensing elements or pixels arranged in a two dimensional area array wherein each image sensing pixel converts the incident image defining scene light rays into a corresponding analog voltage value. The transmission of scene light by way of the objective taking lens 30 to the photoresponsive array 92 is controlled by a shutter as shown at 90. The duration of each still image exposure interval is controlled in a conventional manner by way of an exposure, strobe, and focus control circuit 96. As is readily apparent, the circuit 96 may also operate to automatically control the focus of the objective taking lens 30 in any well-known manner such as by way of sonar or infrared rangefinders. In addition, the control circuit 96 also operates to effect the discharge of an electronic strobe flashtube 98 at the precise moment during the exposure interval.

After the exposure interval, the analog values of the individual pixels of the photoresponsive array 92 are transferred out in a conventional manner by timing clock pulses provided from a timing and control circuit 94. The electronic information signals output from the photoresponsive array 92 are serially transferred to a video signal processing circuit 100 in which the electronic information signals are amplified and filtered in a well-known manner. In addition, a black or dark current reference voltage may also be clamped to a select reference voltage level in a manner as is well known in the art. The electronic information output signals from the video signal processing circuit 100 are thereafter directed to an analog-to-digital converter 102 for conversion from an analog format to a digital format again in a manner as is well known in the art. The digitally formatted electronic information signals are thereafter directed to an image compression processor circuit 104 for compression again in any well-known manner.

The above-described exposure interval may be effected in the field with the electronic imaging camera 12 connected to the hard copy printer 14 in the manner as previously described. In this case, processed, digitally formatted, and compressed electronic image information signals are directed to a printer interface 108 for transmission by way of the electrical contacts 78 and 70 to the hard copy printer 14. Alternatively, the above-described exposure interval could be implemented in the field by the electronic imaging camera 12 without connection to the hard copy printer 14 in which case the storage device 80 would be inserted within the recessed groove 72 of the camera housing 16 and the processed, digitally formatted, and compressed electronic image information signals directed by way of the interface 108 for storage in the storage device 80.

In the case where the electronic imaging camera 12 and hard copy printer 14 are interconnected then it will be understood that the storage device 80 is inserted into the recessed groove 73 in the above-described manner for connection to the hard copy printer 14. Thus, the processed, digitally formatted, and compressed electronic image information signals provided from the electronic imaging camera 12 by way of the interface 108 may be directed by way of another interface 112 in the printer housing 44 for storage in the storage device 80. Alternatively, and at the camera user's discretion by way of appropriately actuated switches on the control panel 64 there is provided an appropriate signal from a control circuit 111 to direct the electronic image information signals received from the electronic camera 12 to a circuit 114 for uncompressing the previously compressed electronic image information signals.

The uncompressed electronic image information signals are thereafter directed to an image enhancement circuit 116 whereby the electronic image information signals may be enhanced in a well-known manner as more fully described in U.S. Pat. No. 4,783,840, entitled "Method for Enhancing Image Data By Noise Reduction or Sharpening", by Woo-Jin Song, issued Nov. 8, 1988, U.S. Pat. No. 4,779,142, entitled "System and Method For Electronically Recording and Playing Back Video Images With Improved Chrominance Characteristics Using Alternate Even and Odd Chrominance Signal Line Matrix Encoding", by William T. Freeman et al., issued Oct. 18, 1988, or U.S. Pat. No. 4,774,565, entitled "Method and Apparatus For Reconstructing Missing Color Samples", by William T. Freeman, issued Sept. 27, 1988, all in common assignment herewith and now all incorporated by reference herein. The enhanced electronic image information signals may thereafter be directed by way of a liquid crystal display (LCD) control circuit 128 to the liquid crystal display 62 on the hard copy printer 14. When the electronic image information signals are stored in the storage device 80, they may be continuously recalled by way of the uncompression circuit 114, image enhancement circuit 116 and LCD control circuit 128 to continuously refresh the LCD 62 and provide a continuing still image of the scene previously sensed by the camera 12 and stored in the storage device 80.

Electronic image information signals may also be simultaneously directed from the image enhancement circuit 116 to a light emitting diode (LED) driving circuit 120 which, in turn, provides the appropriate drive signals to a plurality of light emitting diode (LED) arrays 122 which, in turn, expose a photographic film unit 126 of the self-processing type. The film unit 126 is advanced past the light exposing diodes 122 by appropriate drive rollers rotatably driven by a motor (not shown) under the control of a film motion and control circuit 124. The LED drivers 120 control the energization of the LED's 122 in a manner as is fully described in U.S. Pat. No. 4,525,729, entitled "Parallel LED Exposure Control System", by Martin Agulnek et al., issued June 25, 1985, in common assignment herewith, and now incorporated by reference herein. The film processing rollers ultimately advance the film unit 126 out of the film printer housing 44 by way of the exit slot 60 in a manner as is well known in the art. Thus, in this manner there can be provided an immediate hard copy of the scene sensed during the above-described exposure interval.

The camera user by actuating the appropriate switches in either the printer control panel 64 and/or the electronic camera control panel 42 while still in the field can provide the appropriate control signals by way of control circuits 111 and 110, respectively, to effect any one of a combination of the aforementioned functions. For instance, the camera user can direct the electronic information signals for each scene for storage in the storage device 80. The electronic image information signals can then be recalled for display on the LCD 62 to determine what images are to be transformed into hard copy. The camera user can have the further option of storing none of the electronic image information signals in the storage device 80 but instead directing the signals to provide immediate hard copies in the manner as now provided by conventional instant photographic cameras of the type manufactured and sold by Polaroid Corporation. Alternatively, the user may decide not to print any hard copies in the field at all but instead direct all the images for storage in the storage device 80. He can then disconnect the electronic imaging camera 12 from the printer 14 and take the printer to any convenient place, i.e., office, home, etc., where he can proceed to retrieve the previously recorded images from the storage device 80 for viewing on the LCD 62 and printing of selected images at his discretion. Once the printer 14 is disconnected from the electronic camera 12, it will rest on its major bottom wall member 46 with its LCD display 62 facing upwardly for convenient viewing.

Alternatively, the electronic imaging camera 12 may be taken into the field with its storage device 80 attached instead of the printer 14 for more convenient carrying and handling. The electronic imaging camera 12 with the storage device 80 connected in the aforementioned manner can then be utilized to record a plurality of scenes which are ultimately stored in the storage device 80. The storage device 80 may thereafter be removed from the camera housing 16 and connected to the printer housing 44 in the aforementioned manner whereupon the user can selectively view and print images previously recorded by the camera. Thus, in this manner there is provided an electronic imaging system having tremendous versatility and capability by providing immediate hard copies in the field or alternatively permitting the recording of images electronically in the field with a small compact camera and the subsequent selective viewing and printing of such recorded images in the comfort of the user's home.

Figure 4:
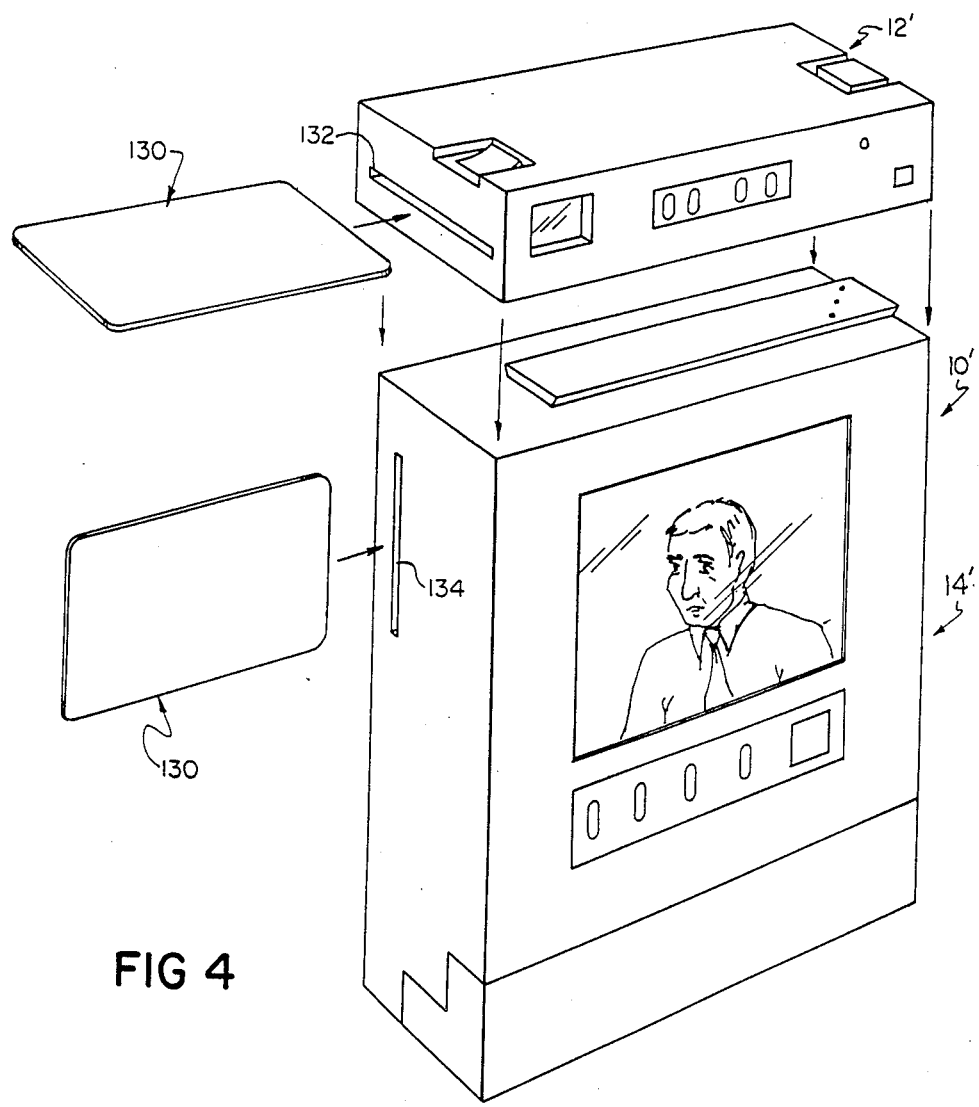
FIG. 4 is an exploded perspective view for an alternate embodiment of the electronic imaging system of FIG. 1.

Although the storage device has been described as residing in an elongated housing that can be conveniently attached to the camera housing 16 in the same manner and place by which the printer housing 44 is connected to the camera housing, it will be readily understood that the electronic information storage device may assume a variety of shapes and sizes such as a rectangular card 130 that may be inserted into corresponding slots 132, 134 in the camera and printer housings as shown in FIG. 4. In this instance, as is readily apparent, a second interface must be provided in the electronic imaging camera 12 as shown in phantom line at 106 in FIG. 3 to connect to the storage device 80 as also shown in phantom line. In the case where the camera user operates the system with the camera and printer connected, he may then have the option by way of actuating appropriate switches of the control panel 42 to direct the electronic image information signals for either storage in the storage device 130 by way of the interface 106 or to the printer 14 by way of the interface 108. Also, it should be readily understood that the storage device 130 could alternatively be an optical storage card with the camera and printer having appropriate read/write drivers associated therewith.

Other embodiments of the invention, including additions, subtractions, deletions and other modifications of the preferred disclosed embodiments of the invention will be obvious to those skilled in the art and are within the scope of the following claims.

What is claimed is:

1. A readily portable electronic imaging system comprising:
    a camera housing of a size that is conveniently carried by hand;
    a printer housing distinct from said camera housing and also of a size that is conveniently carried by hand;
    an objective lens operatively disposed with respect to said camera housing to receive and focus incident image defining scene light;
    a solid state light responsive array disposed within said camera housing for receiving incident scene light by way of said objective lens and converting such scene light into an image defining electronic information signal;
    storage means releasably and operatively connectable to said camera and printer housings for storing the image defining electronic information signals;
    complimentary releasable connecting means operatively associated with respect to said camera and printer housings for effecting a releasable fixed connection between said camera and printer housings, said fixed connection also operating to effect an electrical connection between said camera and printer housings;
    hard copy printing means disposed within said printer housing for making a hard copy of select images from said image defining electronic information signals; and
    signal control and processing means having portions disposed respectively within said camera and printer housings and responsive to user selection for effecting an exposure interval and thereafter processing said image defining electronic information signal to effect a select transformation thereof, said control means thereafter responding to user selection for directing said transformed electronic information signals to either said storage means for storage therein or said hard copy printing means for printing said hard copy wherein said portion of said signal control and processing means disposed within said printer housing is responsive to user selection when said printer housing is disconnected from said camera housing and said storage means is operatively connected to said printer housing for directing image defining electronic information signals from said storage means to said hard copy printing means in order to print hard copies of select images.

2. The system of claim 1 wherein said portion of said signal control and processing means disposed within said camera housing is responsive to user selection when said camera housing is disconnected from said printer housing and said storage means is operatively connected to said camera housing for directing image defining electronic information signals from said light responsive array to said storage means immediately subsequent to each exposure interval.

3. The system of claim 2 wherein said storage means comprises a housing having a releasable connecting means for releasably connecting to that portion of said complimentary connecting means operatively associated with said camera housing.

4. The system of claim 3 wherein said printer housing has another releasable connecting means spaced apart from the portion of said complimentary connecting means associated with said printer housing for connecting said printer housing to said camera housing, for connecting to said releasable connecting means associated with said storage means housing.

5. The system of claim 4 wherein said releasable connecting means for effecting releasable connections between: said camera and printer housings, said camera housing and said storage means and said printer housing and said storage means comprises tongue and groove connecting members which slidably interconnect.

6. The system of claim 5 wherein said tongue and groove connecting members each comprise complimentary electrical connectors which slide over each other during the sliding movement of said tongue and groove connecting members so as to wipe clean said electrical connectors.

7. The system of claim 2 wherein said storage device comprises a solid state memory device.

8. The system of claim 2 wherein said storage copy printing means includes means for exposing a photosensitive photographic film of the self-developing type.

9. A readily portable electronic imaging system comprising:

a camera housing of a size that is conveniently carried by hand;

a printer housing distinct from said camera housing and also of a size that is conveniently carried by hand;

an objective lens operatively disposed with respect to said camera housing to receive and focus incident image defining scene light;

a solid state light responsive array disposed within said camera housing for receiving incident scene light by way of said objective lens and converting such scene light into an image defining electronic information signal;

storage means releasably and operatively connectable to said camera and printer housings for storing the image defining electronic information signals;

complimentary releasable connecting means operatively associated with respect to said camera and printer housings for effecting a releasable fixed connection between said camera and printer housings, said fixed connection also operating to effect an electrical connection between said camera and printer housings;

hard copy printing means disposed within said printer housing for making a hard copy of select images from said image defining electronic information signals; and signal control and processing means having portions disposed respectively within said camera and printer housings and responsive to user selection for effecting an exposure interval and thereafter processing said image defining electronic information signal to effect a select transformation thereof, said control means thereafter responding to user selection for directing said transformed electronic information signals to either said storage means for storage therein or said hard copy printing means for printing said hard copy wherein said portion of said signal control and processing means disposed within said camera housing is responsive to user selection when said camera housing is disconnected from said printer housing and said storage means is operatively connected to said camera housing for directing image defining electronic information signals from said light responsive array to said storage means immediately subsequent to each exposure interval and wherein: said camera housing comprises substantially planar major bottom and top wall members interconnected by substantially planar minor side, front and back wall portions to define a substantially parallelepiped structure wherein said objective lens is disposed in said front wall portion of said camera housing, said printer housing comprises substantially planar major top and bottom wall members interconnected by substantially planar minor side wall portions to define a substantially parallelepiped structure, said complimentary releasable connecting means operatively associated with said camera and printer housings comprises portions for connecting the major bottom wall member of the camera housing to a minor side wall portion of the printer housing.

10. The camera of claim 9 wherein the minor side wall portions of the camera housing are longer than the width of the minor side wall portions of the printer housing so that the camera housing is cantilevered with respect to the printer housing when the camera and printer housings are interconnected.

11. The camera of claim 9 wherein the side wall portions of the printer housing opposite to the side wall portion that connects to the camera housing has an exit slot through which the hard copy can be advanced from the printer housing by the hard copy printing means in a direction generally parallel to the major top and bottom walls of the printer and orthogonal to the bottom wall of the camera housing when the camera and printer housings are interconnected.

12. The camera of claim 11 wherein the side wall of the printer housing having an exit slot therethrough also comprises the major surface of a pivotal door assembly that may be opened to allow loading of unexposed hard copy media.

13. The camera of claim 9 wherein the major top wall portion of the printer housing includes a display device and said signal and processing means is responsive to user selection to provide a select image defining electronic information signal to said display device to provide a visually discernible image.

14. The camera of claim 9 wherein one of the side wall portions of said printer housing is substantially orthogonal to the side wall portion that connects to the camera housing and comprises means for releasably connecting said storage means.

* * * * *